United States Patent [19]

Charbonnier

[11] 3,902,013

[45] Aug. 26, 1975

[54] FREQUENCY SYNTHESIS CONTROL FOR A FREQUENCY-MODULATED TELEGRAPHIC TRANSMITTER

[75] Inventor: Roger Charbonnier, Meudon, France

[73] Assignee: Adret-Electronic, Trappes, France

[22] Filed: June 24, 1974

[21] Appl. No.: 482,730

Related U.S. Application Data

[63] Continuation-in-part of Ser. No. 318,923, Dec. 27, 1972, abandoned.

[30] Foreign Application Priority Data

Jan. 4, 1972 France .............................. 72.00091

[52] U.S. Cl. ................................ 178/66 A; 325/163

[51] Int. Cl. ............................................ H04l 27/00

[58] Field of Search ........... 178/66 R, 66 A; 325/30, 325/163; 331/179; 179/15 BV

[56] References Cited

UNITED STATES PATENTS

| | | | |
|---|---|---|---|
| 3,611,148 | 10/1971 | Cox | 325/163 |
| 3,731,233 | 5/1973 | Hutchinson | 325/163 |

*Primary Examiner*—Albert J. Mayer

*Attorney, Agent, or Firm*—William Anthony Drucker

[57] ABSTRACT

Control device for a frequency-modulated telegraphic transmitter making use of a variable oscillator the frequency of which is controlled by a phase-lock loop. The counter-divider comprised in this loop is programmed by two different instruction numbers, given by a coding matrix, the passage from one instruction number to the other being controlled by the telegraphic signal. A frequency synthesizer, connected to the output of the oscillator, makes it possible to vary the control transmitting frequency.

7 Claims, 2 Drawing Figures

FREQUENCY SYNTHESIS CONTROL FOR A FREQUENCY-MODULATED TELEGRAPHIC TRANSMITTER

This is a continuation-in-part of U.S. Ser. No. 318,923 filed Dec. 27, 1972, now abandoned.

The invention relates to keying frequency modulation telegraphy transmitters operating in mode $F_1$ (for which two modulation frequencies are used) or $F_6$ (for which four modulation frequencies, in arithmetic progression, are used).

Generally the prior art uses a pilot oscillator whose frequency is shifted from one value to another by analog control (i.e.) using for the oscillator frequency control voltage, a voltage proportional to the telegraphic signal amplitude, said frequency thus assuming successively values $F_o + \Delta F$ and $F_o - \Delta F$, and additive interference being effected between the oscillator and standard frequencies, finally giving a frequency assuming two values, $F_1 - \Delta F$ and $F_1 + \Delta F$. This beat method is designed to give an acceptable relative accuracy on $F_1$. However, the change-over $\Delta F$ got by this analog control is not exact. There is thus uncertainty regarding the two extreme frequencies. Further, the time of passage from one frequency to the other is not precisely fixed, and in practice this necessitates passing the telegraphic signal, prior to applying it to the analog control component, through a low-pass filter, to make the times of frequency rise and fall compatible with the norms imposed.

To overcome these difficulties the invention proposes a particularly simple circuit arrangement which uses a variable oscillator whose frequency is controlled by a phase locking loop.

This loop's counter-divider is programmed by two different instruction numbers, given by a coding matrix, the passage from one instruction number to the other being effected under the control of the telegraphic signal.

A frequency synthesizer, connected to the variable oscillator output, makes it possible to vary the central transmitting frequency.

Figure 1:
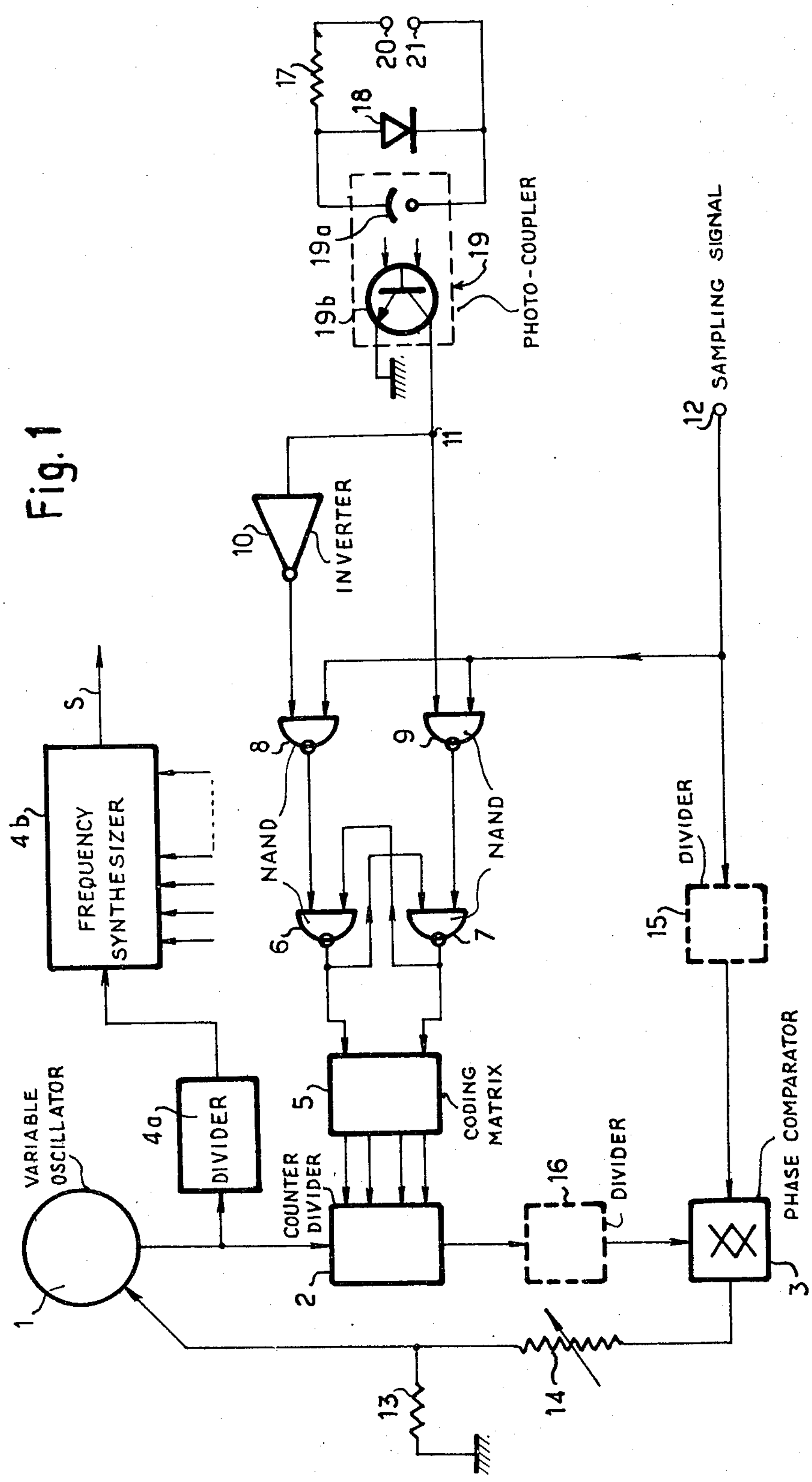
Figure 2:
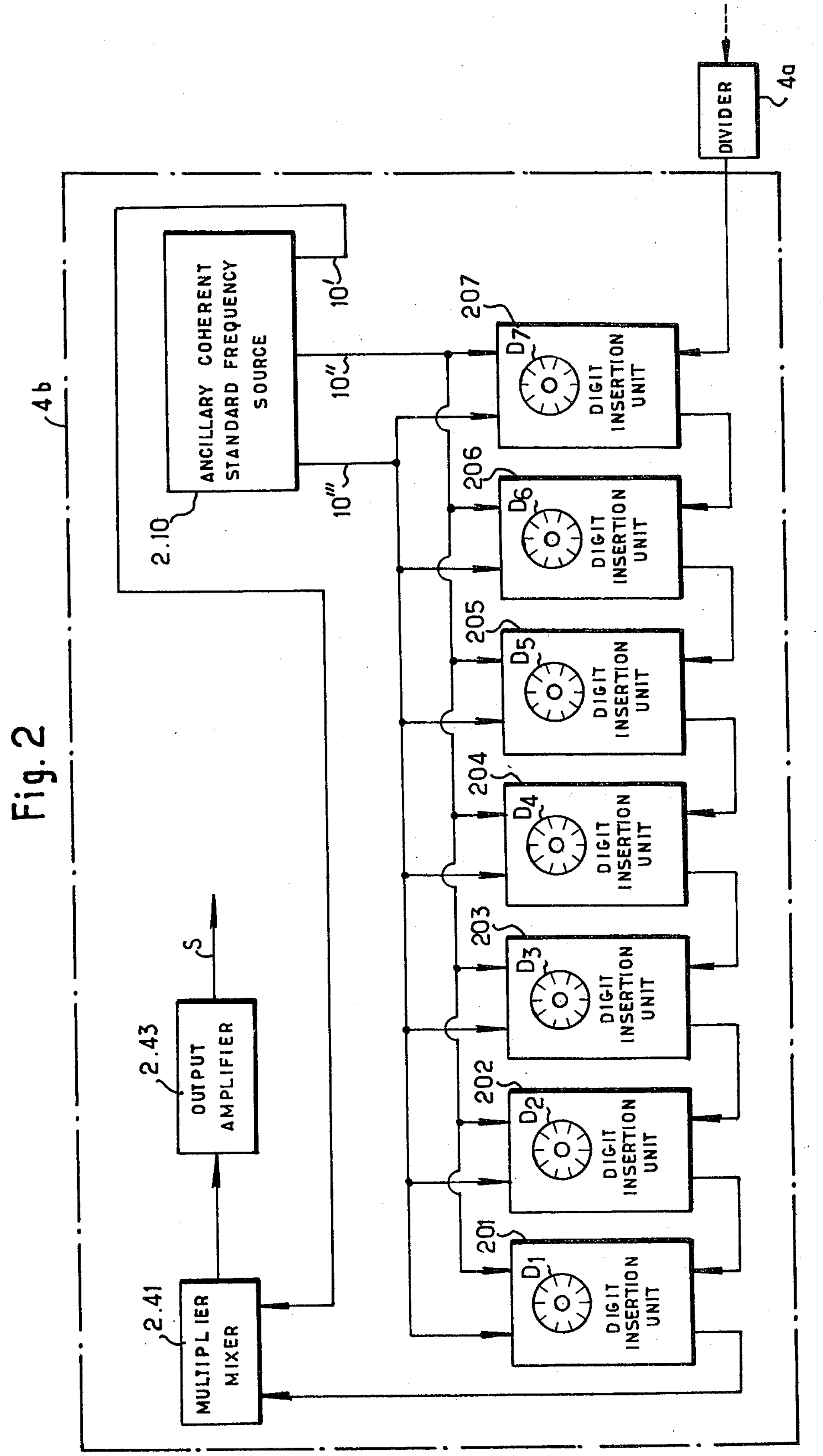

The invention will be better understood from the description below and from the appended drawing wherein:

FIG. 1 is a diagrammatic representation of a pilot for a telegraphic transmitter, in accordance with a preferred mode of embodiment of the invention; and FIG. 2 shows the particulars of the connection of a known utilization device to the output of the circuit according to the invention.

This pilot is intended for a transmitter working in mode $F_1$, which is the one most used in practice.

It is seen to comprise a phase-locking loop (variable oscillator 1, counter-divider 2 which can be programmed, and phase comparator 3) wherein the oscillator has its output connected, via divider 4*a* of fixed ratio K, to a frequency synthesizer 4*b* delivering at its output S, the desired two frequencies $F + \Delta F$. Frequency synthesizer 4*b* is for instance of the type disclosed in the U.S. Pat. No. 3,300,731 patented Jan. 24, 1967 in the name of Alberton Noyes for "Digital Frequency synthesizer having a plurality of selectably connectable phase-locked digit insertion units." In this case, the synthesizer of the Noyes patent is simplified as described hereafter with reference to FIG. 2.

Counter-divider 2's division ratio is defined by an instruction number delivered by coding matrix 5. Counter-divider is e.g., of the type described in U.S. application Ser. No. 298,424 filed Oct. 17, 1972 by Roger Charbonnier for "Variable-ratio Electronic Counter Divider," now U.S. Pat. No. 3,811,092 granted May 14, 1974. An electronic device consisting of a bi-stable flip-flop made up of two NAND gates 6, 7, two NAND gates 8, 9 and logical inverter 10, causes the said instruction number to go from an $N + n$ value to an $N - n$ value, according to whether the telegraphic signal applied to the terminal 11, is at 0 level or 1 level. More precisely, the change of instruction can only occur at the times of the transition fronts towards 1 of a sampling signal whose standard frequency $f$ greatly exceeds that of the telegraphic signal. This sampling signal is a rectangular wave signal applied to terminal 12 and moreover acts as a reference frequency for phase comparator 3. The frequency of the sampling signal is, as a non limiting example, 10 KHz and the ratio between marks and spaces is for instance 1:5.

It is in fact seen that when the sampling signal and the telegraphic signal are both at 1 level, gate 9 gives a 0 level at its output, while gate 8 then gives a 1 level (since it receives the 0 level supplied by inverter 10). Then gate 7 gives a 1 level at its output. Gate 6, as it thus receives two 1 levels, supplies 0 at its output.

Matrix 5 is a read-only memory wherein the numbers $N + n$ and $N - n$ have been recorded and are selectively read-out according to which one among two of its inputs, respectively associated to said numbers, is energized. Matrix 5 is, e.g., of the type described in the U.S. Pat. No. 3,461,436 in the name of Navon et al., patented Aug. 12, 1969 for "Matrix-type permanent memory device." If necessary, an interface device will be supplied between the matrix output and the counter-divider inputs for converting number $N - n$ and $N + n$ signals into a form suitable for being applied to the control inputs of counter-divider 2, which form depends on the type of divider 2. Another particularly advantageous type of matrix usable here is the matrix XC 170, sold by the firm Motorola, which supplies BCD output signals directly appliable to the inputs of counter-divider 2, if the latter is of the type referred to hereinabove; should the Motorola matrix be used, the enabling inputs of the matrix should be energized continuously during operation of the circuit of the invention. The Motorola matrix can be programmed for supplying any desired values $N + n$ and $N - n$.

When the telegraphic signal passes to 0 level, at the times when the sampling signal is itself at 1 level, the gate 8 output goes to 0 level, so that the output from gate 6 goes to 1 level. For its part gate 9, receiving at least one 0, supplies a 1. Gate 7, receiving two 1 levels, supplies a 0. Finally, the state of the inputs of matrix 5 is inverted, and it is then arranged to code the number $N - n$. It is easy, on the other hand, to see that a change in the level of the telegraphic signal has no effect when the sampling signal is at 0 level.

Comparator 3 compares the frequency $f$ with the oscillator frequency divided by $N + n$ or $N - n$, so that said frequency is stabilized at a value equal to $f(N + n)$ or $f(N - n)$.

In other words, the frequency of the output signal of divider 4*a* is of the form $F_o \pm \Delta F$, where $\Delta F = nf/K$. For example, the apparatus should generate a frequency whose principal term $F_o$ can vary between 2 and 32 MHz, and the increment $\pm \Delta F$ from 100 to 500 Hz in round values, (100 Hz, 200 Hz, etc.).

The variation in the $F_0$ term is easily obtained by numerical programming of frequency synthesizer 4*b*.

FIG. 2 shows how the output signal of divider 4*a* is applied to the known frequency synthesizer disclosed in the Noyes patent, already referred to.

In this figure only so much of the FIG. 1 circuit and of the Noyes synthesizer are shown, as is necessary for the understanding of the connection divider 4*a* – synthesizer 4*b*.

The ancillary frequency source of coherent standard frequencies is shown at 2.10 with its three outputs respectively 10′, 10″ and 10 ‴. The continuous adjustable digit unit, referred to as 9 in Noyes, is not connected here, signal of output 10′ being only applied to multiplier mixer 41.

The digit insertion units 20.1 to 20.7 (1 to 7 in Noyes) are connected in series, the control input of unit 20.7 being fed with the output signal of divider 4*a* of FIG. 1. The digit being permanently intercoupled, the switches shown in Noyes are useless and so are the push-buttons and the lamps associated therewith, and also the beat output and monitor meter, therefore these devices are not shown here. The output of amplifier 243 is the output S of FIG. 1. The arrows in FIG. 1 representing symbolically the control of the synthesizer are here the control knobs and dials $D_1$ to $D_7$. Of course, the value of the frequencies at 10′, 10″, 10‴ may be different from those indicated in Noyes according to the utilization desired. Of course also, any other known frequency sunthesizer having a modulation input for signal from divider 4*a* is suitable, the type of the synthesizer being essentially a matter of choice up to the user of the circuit of the invention, this choice depending essentially on the performances required from the synthesizer.

To get a $\Delta f$ variation of 50 Hz while varying n by unity (by acting on the coding matrix), it suffices to take F = 10 KHz and K = 200.

It should be mentioned that electronic device 6–11 allows the telegraph signal value change information to be enabled at preset times in the stabilization cycle of the phase-locking loop.

Now it is known that such a loop only takes into account the digital information applied to counter-divider 2, at the end of its counting cycle. During this reckoning interval, the instruction number must obviously not be able to vary. For this to be so, it is sufficient to impart to the frequency f sampling signal a wave form such that sampling occurs systematically outside said interval. Thus the telegraph signal level is, as it were, stored in flip-flop 6–7, and enabled solely at the appropriate sampling times.

The time of passage of the oscillator from one frequency to the other obviously depends on the time constant of the phase-locking loop. This is known to be $N/2 \pi ab$, where N is the division ratio of the counter-divider, a is the ratio $\Delta F / \Delta V$, where $\Delta F$ is the frequency change due to a change $\Delta V$ in the oscillator frequency control voltage, and b is the ratio $\Delta V/\Delta Y$, where $\Delta Y$ is the phase difference in radians between the two voltages applied to the inputs. of the phase comparator and $\Delta V$ is the corresponding output voltage in volts of said comparator.

In other words, the oscillator frequency passage time from one value to another depends on the division ratio N and the terms *a* and *b*. It is then possible to control the time of passage from one frequency to another frequency generated by the arrangement by suitable choice of the value of N (by suitable construction or programmation of the coding matrix), and/or by adjusting one of the terms *a* and *b*. This last adjustment can be made very simply by a resistor bridge 13–14 making it possible only to transmit to the oscillator frequency control component an adjustable fraction of the output voltage of the phase comparator, the effect of which is to influence term a.

It is to be emphasized that the two frequencies generated by the arrangement are perfectly determined, as the oscillator gives two frequencies $f(N + n)$ and $f(N - n)$, where f is a standard frequency and N and n are integers. The accuracy of the output frequencies depends, finally, solely on the synthesizer 4, which will obviously be quartz-controlled.

Two frequency dividers 15 and 16 with the same ratio P are shown in dotted lines. These dividers are in no way essential. Obviously they do not modify the frequency of oscillator 1. On the other hand, the loop's time constant will be multiplied by P. Thus there is available an additional means of adjusting the time of passage from one frequency to another.

Also shown are resistor 17, diode 18, and photocoupler 19, comprising an electro-luminescent diode 19*a* and a photo-transistor 19*b*.

The signals coming from the telegraph line are applied to terminals 20–21, generally as a chopped floating 48 volt voltage. Resistance 17 charges the line, and the current passing in the electro-luminescent diode 19*a* causes a light emission which is captured by the photo-transistor, which transforms it into a voltage at terminal 11.

This arrangement gives perfect insulation between line and pilot. Diode 18 protects the electro-luminescent diode 19*a*, by deriving the current at the time when the signal's polarity is inverted.

The device described is easily adapted to piloting a telegraphic transmitter working in the mode $F_6$. To achieve this it is sufficient to construct the coding matrix 5 so that it gives four instruction values $N - 3n$, $N - n$, $N + 3n$, $N + n$ in arithmetic progression, and to double the control circuits 6–21 which will then receive two telegraphic signals. In this case, the Motorola matrix XC 170 can still be utilized advantageously, four ones among its inputs being now utilized two inputs being coupled to the outputs of gates 6 and 7 of a first control circuit such as 6–21 already described, and the two further inputs being coupled to the outputs of the corresponding gates in the second circuit similar to circuit 6–21.

It is obvious that various modifications can be introduced, without departing from the spirit and scope of the invention, as defined in the appended claims.

I claim:

1. A device for controlling the frequency of a frequency modulated telegraphic transmitter as a function of the telegraphic signal amplitude, said device comprising a variable oscillator and a phase lock loop for controlling the variable oscillator's frequency, said phase lock loop comprising a counter-divider connected at the oscillator output and programmable by an instruction number and a phase comparator having two inputs respectively connected to the counter-divider output and to a source of a two level standard frequency signal, said phase comparator having an output connected to a frequency control input of the variable oscillator, characterized by a coding matrix, means connected to said matrix for applying thereto a two level control signal derived from the telegraphic signal, said matrix being connected to the counter-divider for applying thereto first and second values of the said instruction number, when the said control signal is at, respectively, its first and second levels.

2. A control device as claimed in claim 1, further comprising a frequency synthesizer connected to the output of the variable oscillator.

3. A control device as claimed in claim 2, characterized by logical means for enabling the change in level of the control signal applied to the matrix at the times of transition towards one of its levels of said standard frequency signal, the latter having such a waveform that said times of transition will not coincide with the times when the counter-divider is counting the instruction number.

4. A control device in accordance with claim 3, characterized in that said logical means include a bi-stable flip-flop arranged so as to act as a memory.

5. A control device in accordance with claim 2, characterized by a fixed ratio frequency divider connected between the oscillator output and the synthesizer.

6. A control device in accordance with claim 2, characterized by two fixed ratio frequency dividers connected respectively between the counter-divider and the phase comparator, and between the phase comparator and the standard frequency source.

7. A control device in accordance with claim 2, characterized by an adjustable voltage divider, connected between the phase comparator output and the variable oscillator frequency control input.

* * * * *